Sept. 10, 1929.  H. SCHUBERT  1,727,944
SUPPORT OR CARRIER FOR MATERIAL TO BE SIFTED
Filed April 2, 1927
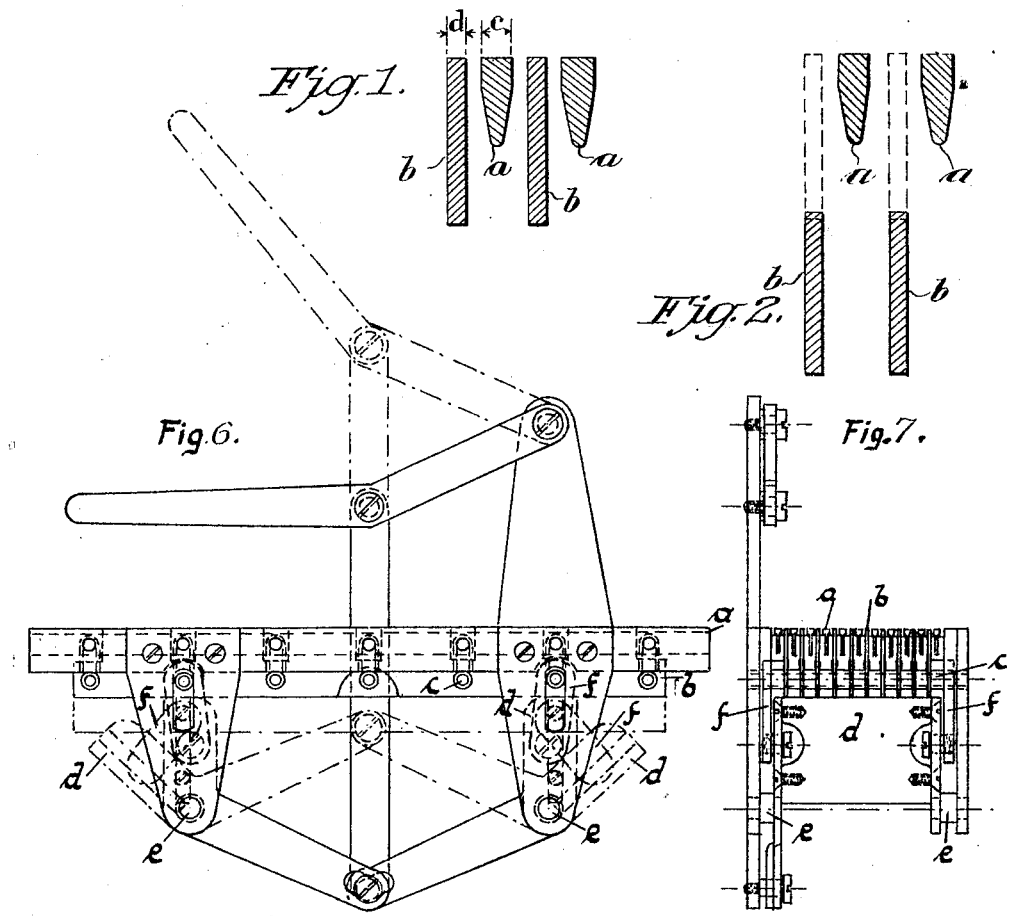
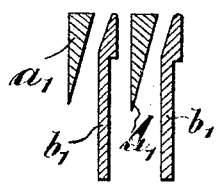
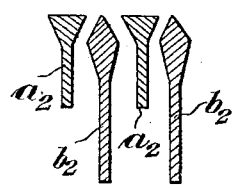
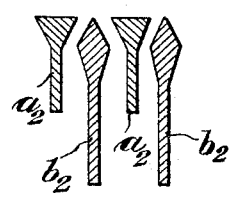
Inventor:-
Hermann Schubert
by attorneys Patented Sept. 10, 1929.

1,727,944

UNITED STATES PATENT OFFICE.

HERMANN SCHUBERT, OF RADEBEUL, NEAR DRESDEN, GERMANY.

SUPPORT OR CARRIER FOR MATERIAL TO BE SIFTED.

Application filed April 2, 1927, Serial No. 180,517, and in Germany April 23, 1926.

The present invention has for its object a sifting or sieve grate, especially a support or carrier for material to be sifted as used for dressing or washing ores, charcoal or the like. In the sifting devices known up to the present it is, with certain shapes of the material to be dressed or washed, impossible to keep the apertures permanently open for the passage of the material. The apertures mentioned are blocked up by splintery or slate-like particles and must regularly be cleaned; said cleaning-operation is a very expensive one and results in interruption of the work, loss of time and waste of material. The cleaning operation, too, often causes damage to the support carrying the material, as, for instance, by driving the splits and scales present into the apertures of the perforated sheets. Said cleaning procedure has to be repeated in most cases every eight days at least. Now, in view of the fact that by that time about half of all the apertures are entirely blocked, the output of work will be reduced materially after lapse of half a week till the minimum of output is reached whereupon cleaning becomes necessary.

According to the present invention the disadvantages mentioned are prevented by making the support or carrier for the material to be sifted of two sifting-systems vertically or obliquely moving one in another.

The object of the invention is disgrammatically represented in the drawing in various forms of construction in Figs. 1 to 5 in a vertical section. Fig. 6 represents a side elevation of one type of bar supporting and moving means; and Fig. 7 represents an end elevation of the same.

As represented in Fig. 1 the support for carrying the material to be sifted is formed by a system of bars $a$ and by a system of profiles $b$. Said system of profiles $b$, Fig. 2, can be moved relative to the bars $a$ in a downward and vertical direction in such a manner that the passage-apertures are increased at the working-surface and the material caught can freely fall through in a downward direction. The width $c$ of the profiles $a$ is larger than the width $d$ of the bars or profiles $b$ so that the passage-apertures at the working surface are smaller than the corresponding apertures in the system to be moved in a downward direction, and a safe passage through the larger apertures of the system to be lowered is ensured.

According to Fig. 3 the slots situated between the carrying and lowering system are not vertically but obliquely and vertically arranged by reason of the triangular section of the bars $a^1$, while the bars $b^1$ of the lowering system are provided with surfaces arranged parallel to the adjacent surfaces of the bars $a^1$.

According to Fig. 4 the support for carrying the material to be sifted consists of pyramidal profiles, the bars $a^2$ being those of the carrying system and the bars $b^2$ those of the lowering system.

In the arrangement shown in Fig. 5 the lowering system is arranged in face of the working surface at a lower level whereby the passage-apertures are of somewhat larger dimensions. By the form of construction shown in Figs. 4 and 5 the advantage is still obtained that by a vertical adjustment in height of the lowering system the width of the passage apertures can be altered. Said advantage can also be obtained by the construction shown in Fig. 3; in this case the lowering system must then not be moved and adjusted vertically but obliquely in a downward direction.

In Figs. 6 and 7 is shown an example of supporting frame and actuating structure for the sieve systems. The stationary bars are designated $a$ and the movable bars $b$. The latter are shown as mounted on transverse rods $c$, below which an arm $d$ is rotatably mounted on a fixed pivot $e$. The arm $d$ may desirably be connected to the bars $b$ through a link $f$, so arranged that rotation of the arm around its pivot will pull down or push up the bars $b$ in a manner readily understandable from the drawing. A plurality of arms $d$ and links $f$ may be provided and simultaneous action thereof ensured through the use of toggle or the like connections. In Fig. 6 the lowered position of the movable bars $b$ is indicated by dot-and-dash lines.

Without in any manner leaving the scope of the present invention, the latter can also be used for supports carrying material to be sieved.

What I claim is:

1. A grate of the character described for carrying material to be sifted, comprising, two cooperating sieve systems, means for supporting said systems, and means for movig one system in a generally vertical downward direction with respect to the other system and to such an extent that the clear space between the bars of the lower system and the adjacent bars of the upper system is at least as great as the clear space between adjacent bars of the upper system.

2. A grate of the character described for carrying material to be sifted, comprising, two cooperating sieve systems, means for supporting said systems, and means for moving one system in a generally vertical downward direction with respect to the other system, the width of the individual bars of the upper system being greater than the width of the individual bars of the lower system, whereby the clear space between adjacent bars of the lower system is greater than the clear space between adjacent bars of the upper system.

3. A grate of the character described for carrying material to be sifted, comprising two cooperating sieve systems, means for supporting said systems, and means for moving one system in a generally vertical downward direction with respect to the other system and to such an extent that the clear space between the bars of the lower system and the adjacent bars of the upper system is at least as great as the clear space between adjacent bars of the upper system, the width of the individual bars of the upper system being greater than the width of the individual bars of the lower system, whereby the clear space between adjacent bars of the lower system is greater than the clear space between adjacent bars of the upper system.

In testimony, that I claim the foregoing as my invention, I have signed my name this 19th day of March, 1927.

HERMANN SCHUBERT.